United States Patent [19]
Berge et al.

[11] Patent Number: 5,673,456
[45] Date of Patent: Oct. 7, 1997

[54] WINDSCREEN WIPER DEVICE FOR A MOTOR VEHICLE PROVIDED WITH A COVERING SHROUD

[75] Inventors: Gilles Berge, Rambouillet; Jean-Pierre Eustache, Antony, both of France

[73] Assignee: Valeo Systemes d'Essuyage Z.A. de l'Agiot, La Verriere, France

[21] Appl. No.: 571,043

[22] Filed: Dec. 12, 1995

[30] Foreign Application Priority Data

Dec. 13, 1994 [FR] France .................. 94 15629

[51] Int. Cl.$^6$ .................. B60S 1/32; B60S 1/34
[52] U.S. Cl. .................. 15/250.351; 15/250.34; 15/250.352; 15/250.32
[58] Field of Search .................. 15/250.351, 250.352, 15/250.201, 250.32, 250.31, 250.34, 250.202

[56] References Cited

U.S. PATENT DOCUMENTS

| | | | |
|---|---|---|---|
| 2,191,423 | 2/1940 | Browne | 15/250.32 |
| 2,799,039 | 7/1957 | Oishei | 15/250.202 |
| 3,160,906 | 12/1964 | Morena | 15/250.352 |
| 3,263,261 | 8/1966 | Schultz | 15/250.351 |
| 3,263,262 | 8/1966 | Wise | 15/250.32 |
| 3,849,829 | 11/1974 | Wubbe | 15/250.32 |
| 4,296,520 | 10/1981 | Arndt | 15/250.32 |
| 5,081,736 | 1/1992 | Schon | 15/250.351 |

FOREIGN PATENT DOCUMENTS

| | | | |
|---|---|---|---|
| 538093 | 4/1993 | European Pat. Off. | 15/250.351 |
| 2487756 | 2/1982 | France | 15/250.351 |
| 2652325 | 3/1991 | France | 15/250.351 |
| 2660267 | 10/1991 | France | 15/250.351 |
| 1087482 | 9/1961 | Germany . | |
| 2337688 | 2/1975 | Germany . | |
| 9101532 | 5/1991 | Germany . | |
| 2021939 | 12/1979 | United Kingdom | 15/250.352 |
| 2151465 | 7/1985 | United Kingdom | 15/250.352 |
| 8403866 | 10/1984 | WIPO | 15/250.351 |

*Primary Examiner*—Gary K. Graham
*Attorney, Agent, or Firm*—Morgan & Finnegan, LLP

[57] ABSTRACT

The invention proposes a windscreen wiper device for a motor vehicle of the type having a windscreen wiper arm (10), one end of which is mounted so as to be articulated about an articulation axis (A1), between a service position and a raised position, on a drive head (12) mounted on a shaft (14) for driving in rotation about an axis (A0) substantially perpendicular to the articulation axis (A1), of the type in which a free end section of the arm (10) carries rotatably a windscreen wiper blade (11), and of the type having a shroud (30) at least partially covering the longitudinal body of the windscreen wiper arm (10), characterised in that the covering shroud (30) encloses the free end section (40) of the arm (10) and in that the windscreen wiper blade (11) is rotatably mounted on the covering shroud (30).

9 Claims, 2 Drawing Sheets

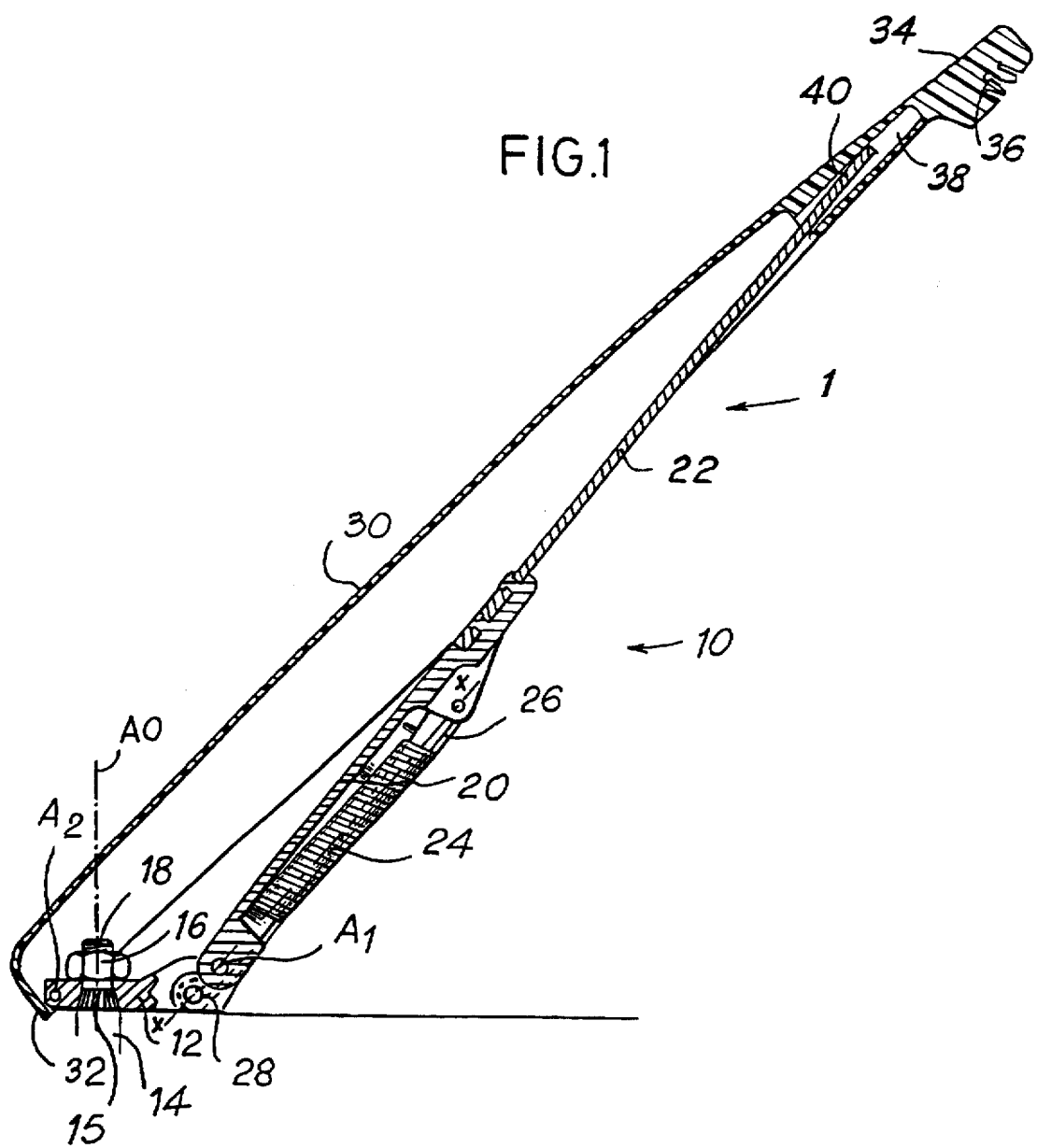

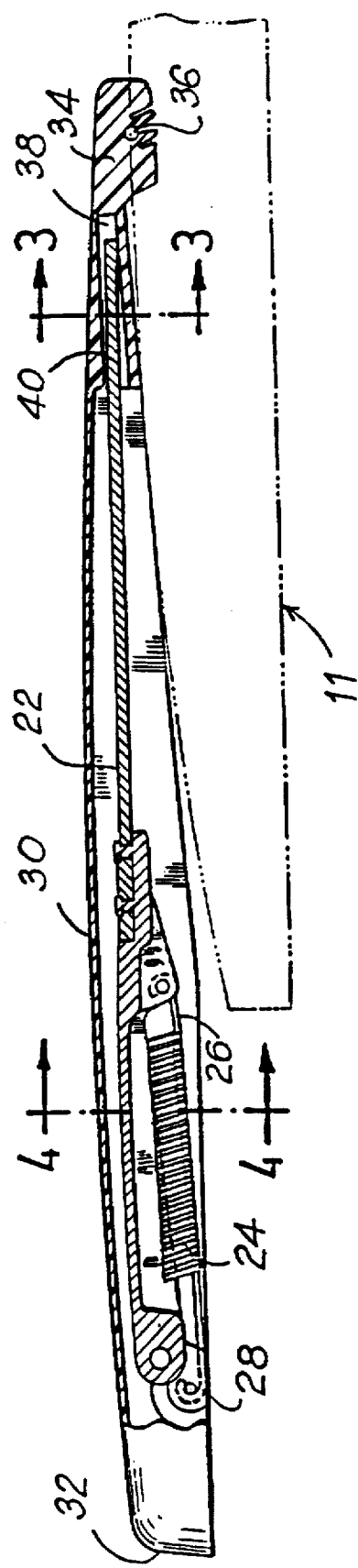
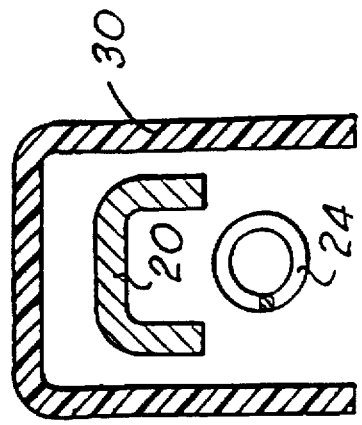
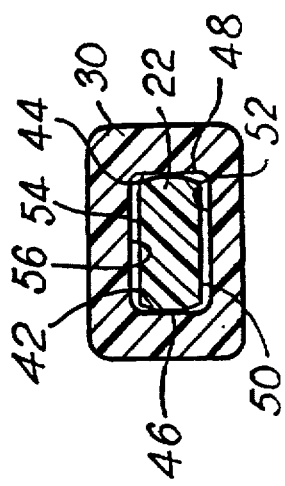

WINDSCREEN WIPER DEVICE FOR A MOTOR VEHICLE PROVIDED WITH A COVERING SHROUD

1. Field of the Invention

The invention concerns a windscreen wiper device for a motor vehicle provided with a covering shroud.

2. Background of the Invention

The invention concerns more precisely a windscreen wiper device for a motor vehicle of the type having a windscreen wiper arm, one end of which is mounted so as to be articulated about an articulation axis, between a service position and a raised position, on a drive head mounted on a shaft for driving in rotation about an axis substantially perpendicular to the articulation axis, of the type in which a free end section of the arm carries a windscreen wiper blade, and of the type having a shroud at least partially covering the longitudinal body of the windscreen wiper arm.

The use is known of a covering shroud which at least partially covers the arm of the windscreen wiper blade in order better to protect the different articulated components and in order to contribute to a more pleasing appearance of the windscreen wiper arm.

There has notably been proposed, in the document FR-A-2 427 227, a windscreen wiper device provided with a covering shroud articulated at one of its ends on the drive head and mounted so as to slide by its other end on the windscreen wiper arm at its end where it joins the shell.

However, this device leaves the end section of the arm visible and also requires an additional piece for fixing the windscreen wiper blade to the end section of the stem.

SUMMARY OF THE INVENTION

The aim of the present invention is therefore to propose a windscreen wiper device for a motor vehicle on which the arm is provided with a covering shroud which covers it entirely and which does not require any additional piece for fixing the blade to the arm.

To this end, the present invention therefore proposes a windscreen wiper device of the type described above, characterised in that the covering shroud encloses the free end section of the arm and in that the windscreen wiper blade is mounted on the covering shroud.

According to other characteristics of the invention:

the free end section of the arm is received in a driving housing of the covering shroud;

the covering shroud is articulated on the drive head, about an axis parallel to the articulation axis, and the free end section of the arm slides longitudinally in the drive housing in which it is able to tilt about a transverse axis parallel to the articulation axis, when the windscreen wiper arm pivots about its articulation axis;

the covering shroud has, in transverse section, an inverted U shape overall and has a substantial free end inside which the drive housing is arranged and on which the windscreen wiper blade is rotatably mounted;

the free end section of the windscreen wiper arm is a stem of substantially rectangular cross section which longitudinally extends a shell, inside which a wiping pressure spring is arranged, and which is mounted so as to be articulated on the drive head;

the free end of the stem has two opposing lateral faces which cooperate respectively with two opposite faces of the drive housing for guiding and driving the covering shroud in alternating wiping;

the free end of the stem has two bottom and top faces which cooperate respectively with two bottom and top faces of the drive housing in order to hold the covering shroud respectively in the service position and in the raised position under the action of the spring;

the covering shroud is produced in a single piece, notably by plastic moulding.

BRIEF DESCRIPTION OF THE DRAWING

Other characteristics and advantages of the invention will emerge from a reading of the following detailed description, for an understanding of which reference will be made to be accompanying drawings in which:

FIG. 1 is a view in axial section of a windscreen wiper device for a motor vehicle according to the invention in the raised position;

FIG. 2 is a view in axial section of such a device in the service position;

FIG. 3 is a transverse section of the free end of a covering shroud according to the invention along the line 3—3 in FIG. 2;

FIG. 4 is a view in transverse section of the windscreen wiper arm along the line 4—4 in FIG. 2.

DETAILED DESCRIPTION

In FIGS. 1 and 2 there are shown in axial section a windscreen wiper device 10 according to the invention.

The windscreen wiper device has a drive head 12 mounted on a drive shaft 14 which controls the alternating wiping movement thereof about an axis A0.

The fixing of the drive head 12 on the drive shaft 14 is provided by flutes 15 and by a nut 16 screwed on the end 18 of the shaft 14.

A windscreen wiper arm 1, formed by a shell 20, elongate and extended longitudinally by a stem 22, is articulated on the drive head 12 about an axis A1 between a service position and a raised position.

As depicted in FIG. 4, the shell 20 has, in transverse section, an inverted U shape overall, inside which a draw spring 24 is received, which is fixed by one of its ends 26 to the shell 20 and by its other end 28 to the drive head 12, behind the articulation axis A1.

The spring 24 enables sufficient wiping pressure to be applied to the windscreen wiper blade 11 in the service position. The spring 24 also enables the windscreen wiper arm 10 to be held in the raised position, when the line of application of the force exerted by the spring 24, that is to say the line X—X passing through the two attachment ends of this spring, is situated at best behind the point of articulation A1 or at most as illustrated in FIG. 2 on this articulation.

The stem 22 is fixed by one of its ends to the shell 20, notably by crimping. It has in transverse section a substantially rectangular shape.

The windscreen wiper arm 10 according to the invention is also provided with a covering shroud 30 elongate in the overall axis of the arm 10 which, except at its ends, has an overall U shape in transverse section, as depicted in FIG. 4.

In the service position, the covering shroud 30 entirely covers the drive head 12 and its fixing to the drive shaft 14, the shell 20, the spring 24 and the stem 22.

The covering shell 30 is mounted so as to pivot about an axis A2 on the drive head 12 by its end 32.

The covering shroud 30 has a second, substantial end 34, which is provided with fixing means 36 designed to receive the windscreen wiper blade 11 directly without requiring any additional intermediate piece.

The end 34 of the covering shroud 30 is also provided with a blind housing 38 oriented substantially in the longitudinal axis of the windscreen wiper arm 10 and designed to receive the free end section 40 of the stem 22.

The housing 38 has, as can be seen in FIG. 3, a rectangular shape in transverse section.

This corresponds to a preferred embodiment of a covering shroud according to the invention, but other shapes, notably elliptical, can be envisaged.

The free end section 40 of the stem 22 is able to slide axially inside the housing 38 and has the possibility of tilting, about a transverse axis parallel to the articulation axis A1, with respect to the end 34 of the covering shroud 30.

This mobility of the stem 22 with respect to the covering shroud 30 is necessary in order to enable the windscreen wiper arm 10 to pass from the service position to the raised position.

This is because the shroud 30 and windscreen wiper arm 10 are articulated on the drive head 12 respectively about axes A2 and A1, which are substantially parallel but not merged.

As a result the free end 40 of the stem 22 and the end 34 of the covering shroud 30 move both longitudinally and angularly with respect to each other when the windscreen wiper arm 10 is brought from the service position to the raised position.

On the other hand, as can be seen in FIG. 3, the free end 40 of the stem 22 is locked transversely in the housing 38 of the covering shroud 30 by the cooperation of the respective lateral surfaces 42, 44 and 46, 48 of the housing 38 and of the stem 22.

The stem 22, which is driven in an alternating wiping movement under the action of the drive shaft 14, can transmit its movement to the covering shroud 30 and therefore to the windscreen wiper arm 11, which is rotatably mounted on the shroud 30.

In the service position, the windscreen wiper blade 11 is held pressed against the screen (not shown) of the vehicle by the spring 24, the action of which is transmitted to the shroud 30 through the cooperation of the bottom surface 50 of the stem 22 with the bottom surface 52 of the housing 38.

In the same way, the whole of the wiper device is held in the raised position through the cooperation of the top surface 54 of the stem 22 with the facing top surface 56 of the housing 38.

A windscreen wiper arm 10 according to this design has the advantage of having, in the service position, the appearance of a single piece and thus avoids any discontinuity of shape which would detract from its appearance.

In addition, the external shape of the covering shroud 30 can be adapted for the purpose of particular functions. It can notably be designed so as to obtain an effect of the aerodynamic pushing of the wiper device designed to combat lifting of the wiper when the vehicle is moving at high speed.

Provision can also be made to dispose, inside the covering shroud 30, a supply tube to a spray manifold mounted on the wiper 11.

What is claimed is:

1. A windscreen wiper device for a motor vehicle, said device comprising a windscreen wiper arm having a longitudinal body, one end of said wiper arm being articulated on a drive head for movement about an articulation axis between a service position and a raised position, a shaft, said drive head mounted on said shaft for driving said windscreen wiper arm in rotation about another axis substantially perpendicular to said articulation axis, said windscreen wiper arm having a free end section including a free terminal end, a windscreen wiper blade carried by said arm, and a one-piece covering shroud completely covering said longitudinal body of said windscreen wiper arm, said shroud enclosing said free end section including said free terminal end, of said arm and said windscreen wiper blade being mounted on said covering shroud, said shroud and wiper arm being relatively movable with respect to one another upon movement between positions of said wiper arm.

2. Device according to claim 1, further comprising said free end section of said arm being received in a driving housing of said covering shroud.

3. Windscreen wiper device according to any one of claims 1 or 2, wherein said covering shroud further comprises a single plastic molded piece.

4. A windscreen wiper device for a motor vehicle, said device comprising a windscreen wiper arm having a longitudinal body, one end of said wiper arm being articulated on a drive head for movement about an articulation axis between a service position and a raised position, a shaft, said drive head mounted on said shaft for driving said windscreen wiper arm in rotation about another axis substantially perpendicular to said articulation axis, said windscreen wiper arm having a free end section including a free terminal end, a windscreen wiper blade carried by said arm, and a one-piece covering shroud at least partially covering said longitudinal body of said windscreen wiper arm, said shroud received on and enclosing said free end section, including said free terminal end, of said arm and said windscreen wiper blade being mounted on said covering shroud, said free end section of said arm being received in a driving housing of said covering shroud, said covering shroud articulated on the drive head about a further axis parallel to said articulation axis, said free end section of said arm is longitudinally movable in said drive housing and tilts relative to said articulation axis, when said windscreen wiper arm pivots about said articulation axis.

5. Device according to claim 4, wherein said covering shroud further comprises, in transverse section, an inverted U shape overall and has a substantial free end in which said drive housing is formed and on which said windscreen wiper blade is rotatably mounted.

6. Device according to claim 5, wherein said free end section of said windscreen wiper arm further comprises a stem of substantially rectangular cross section having a longitudinally extending shell, a wiping pressure spring within said shell, said spring being articulated on said drive head.

7. Windscreen wiper device according to claim 6, wherein said free end of said stem further comprises two opposing lateral faces, and two opposite faces on said drive housing for cooperation with said respective opposing lateral faces and for guiding and driving said covering shroud.

8. Windscreen wiper device according to claim 7, wherein said free end of said stem further comprises a first two faces and a second two faces which cooperate respectively with further corresponding pairs of faces of said drive housing to hold said covering shroud respectively in said service position and in said raised position under the action of said spring.

9. Windscreen wiper device according to any one of claims 4 through 8, wherein said covering shroud further comprises a single plastic-molded piece.

* * * * *